(12) United States Patent
Fowler et al.

(10) Patent No.: US 8,049,802 B2
(45) Date of Patent: Nov. 1, 2011

(54) CMOS CAMERA ADAPTED FOR FORMING IMAGES OF MOVING SCENES

(75) Inventors: Boyd Fowler, Sunnyvale, CA (US); XinQiao Lin, Mountain View, CA (US)

(73) Assignee: Fairchild Imaging, Inc., Milpitas, CA (US)

( * ) Notice: Subject to any disclaimer, the term of this patent is extended or adjusted under 35 U.S.C. 154(b) by 791 days.

(21) Appl. No.: 12/129,607

(22) Filed: May 29, 2008

(65) Prior Publication Data

US 2009/0295951 A1 Dec. 3, 2009

(51) Int. Cl.
*H04N 3/14* (2006.01)
*H04N 5/335* (2006.01)
(52) U.S. Cl. .......... 348/308; 348/302; 348/305
(58) Field of Classification Search .......... 348/302, 348/305, 308
See application file for complete search history.

(56) References Cited

U.S. PATENT DOCUMENTS

2010/0026868 A1* 2/2010 Pertsel et al. ............ 348/308
* cited by examiner

*Primary Examiner* — William Choi
(74) *Attorney, Agent, or Firm* — Calvin B. Ward

(57) ABSTRACT

A camera for forming an image of a scene that moves relative to the camera and the method of forming that image are disclosed. The camera includes an imaging array having a plurality of CMOS pixel sensors having a plurality of columns and rows, an imaging system, and a controller. The imaging system causes a portion of an image of a scene to be projected on the imaging array such that the image of the scene moves across the imaging array in the column direction. First and second images of the scene are formed at first and second times chosen such that the image of the scene moves a predetermined number of rows of the imaging array between the first and second times. The controller combines pixel values from rows in the first image with rows in the second image that are separated by the predetermined number of rows.

28 Claims, 7 Drawing Sheets

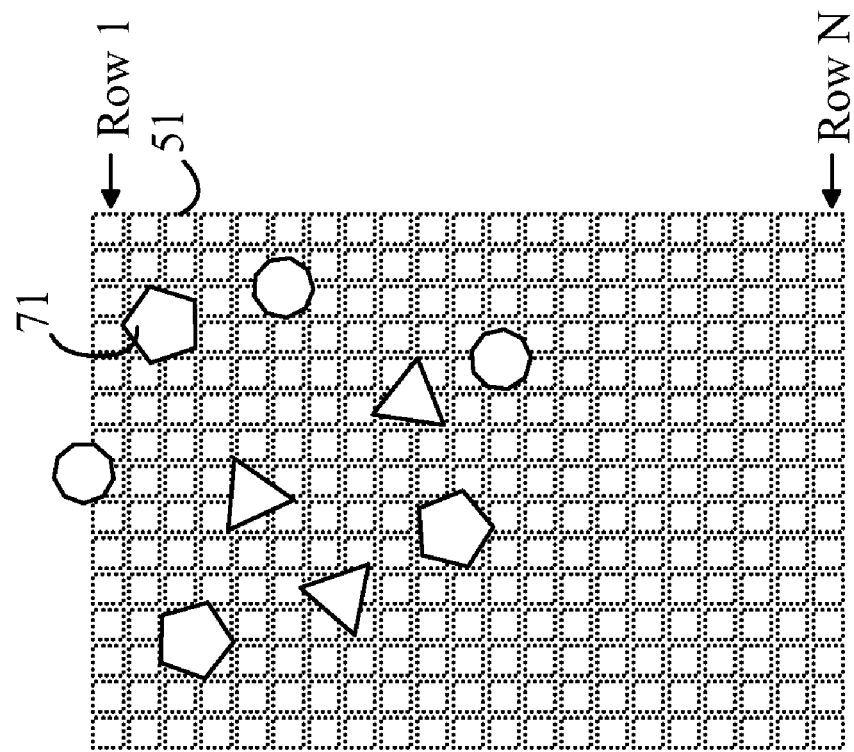
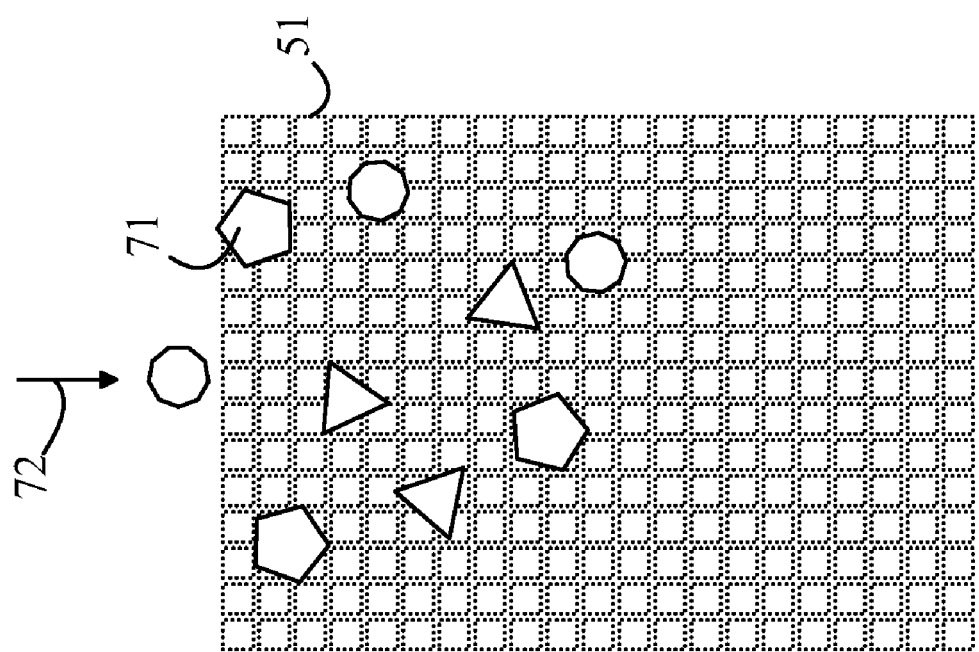

CMOS CAMERA ADAPTED FOR FORMING IMAGES OF MOVING SCENES

BACKGROUND OF THE INVENTION

There are a number of situations in which an image of a scene that is larger than the field of view of a camera is required. One solution to this problem involves forming a number of sub-images in which each image is taken with the camera at a different position relative to the scene. The various sub-images typically overlap one another to some extent. The overlap is then used to combine the sub-images to produce the larger desired image.

Aerial photographic surveys typically utilize such a solution to generate an aerial view of a large geographic area that could not be photographed at the desired resolution in a single photograph. Typically, a camera is mounted on the underside of an aircraft that flies a predetermined pattern over the terrain to be photographed. Images are formed at predetermined intervals and combined later to provide the desired image.

The individual photographs must be taken under constraints imposed by the relative motion of the camera and the scene being photographed and by the lack of an auxiliary light source to improve the exposure. To prevent blurring of the image, the shutter speed must be very high. This constraint, in turn, limits the light that is available for any given exposure. The limited light cannot be augmented by an external light source such as a flash. Even in relatively bright daylight conditions, details in the shadows of trees or other objects may be lost due to the lack of light from these regions. Furthermore, the low light levels cannot be augmented by increasing the f-stop of the camera, since there is a minimum depth of field that is required for each photograph and that depth of field is determined by the variations in the terrain, not by the photographer.

In principle, the sensitivity of the camera can be increased by utilizing large lenses that collect more light. However, economic constraints limit this solution to the problem.

Another potential solution utilizes a scheme in which the overlap between the various images is increased so that each area on the final image is seen in a number of individual sub-images. The data for each pixel is then provided by combining the measurements from the corresponding sub-images, and hence, effectively increasing the exposure time.

However, there is a limit on the number of sub-images that can be taken. In digital photography, the image is projected onto an imaging array consisting of an array of individual light sensing elements that convert the light striking that element to an electric charge that is subsequently read out and digitized. The imaging array typically has several million sensing elements, and hence, the time to read out the imaging array into an associated memory for storage limits the number of frames that can be taken. In addition, the amount of high-speed memory needed to store all of the individual images increases the cost of the system. Finally, the substantial post photographic imaging processing needed to combine the various images to provide the desired composite image also presents substantial economic limitations on such solutions.

SUMMARY OF THE INVENTION

The present invention includes a camera and method for forming an image of a moving scene. The camera includes an imaging array, an imaging system, and a controller. The imaging array includes a plurality of CMOS pixel sensors organized as a plurality of columns and rows of pixel sensors, the columns being characterized by a column direction. Each pixel sensor generates an exposure signal representative of a quantity of light received by that pixel sensor. The imaging system causes a portion of an image of a scene to be projected on the imaging array such that the image of the scene moves across the imaging array in the column direction. The controller causes the imaging array to form first and second images of the scene at first and second times. The first and second times are chosen such that the image of the scene moves a predetermined number of rows of the imaging array between the first and second times. Each image includes a plurality of pixel values, one such pixel value corresponding to each of the pixel sensors. The controller combines pixel values from a first row in the first image with pixel values from a second row in the second image, the first and second rows being separated by the predetermined number of rows.

In one aspect of the invention, the camera includes a memory having a plurality of storage cells organized as a plurality of rows and columns of storage cells, one such storage cell corresponding to each of the pixel sensors. The controller combines the pixel values by adding the pixel values from the first row to the storage cells corresponding to the second row.

In another aspect of the invention, the rows of pixel sensors comprise a first row of pixel sensors, a plurality of intermediate rows of pixel sensors and a last row of pixel sensors, the image of the scene moving over the first row of pixel sensors prior to moving over the second row of pixel sensors. The controller causes the last row of storage cells to be read out of the memory prior to combining the pixel values by adding the pixel values from the first row to the storage cells corresponding to the second row.

In yet another aspect of the invention, each pixel sensor includes a counter register that stores a count that is incremented by an amount that depends on the exposure signal in response to a signal from the controller.

In a still further aspect of the invention, each pixel sensor also includes a storage register in addition to the counter register, the storage register storing the count from the counter register in response to a signal from the controller. The counter register in a first pixel sensor located in a first row and first column of pixel sensors is initialized with the count stored in the storage register of a second pixel sensor located in a second row of pixel sensors in the first column of pixel sensors prior to the counter register being incremented.

In a further aspect of the invention, the image moves across the imaging array with a constant speed and the controller determines the speed in a direction parallel to the columns. The speed can be determined from a signal input to the controller. The speed can also be determined by comparing two images taken at first and second times, respectively. The times are chosen such that the image moves relative to the imaging array by an amount that is greater than one row and less than the number of rows in the imaging array between the first and second times.

In a still further aspect of the invention, the camera also includes an actuator that adjusts an orientation of the imaging array relative to the image of the scene. The actuator is operated such that the image of the scene moves across the imaging array parallel to the columns.

BRIEF DESCRIPTION OF THE DRAWINGS

FIGS. 3 and 4 illustrate the motion of an image across an imaging array at two times at which the shutter is activated to capture image data.

DETAILED DESCRIPTION OF PREFERRED EMBODIMENTS

Figure 1:
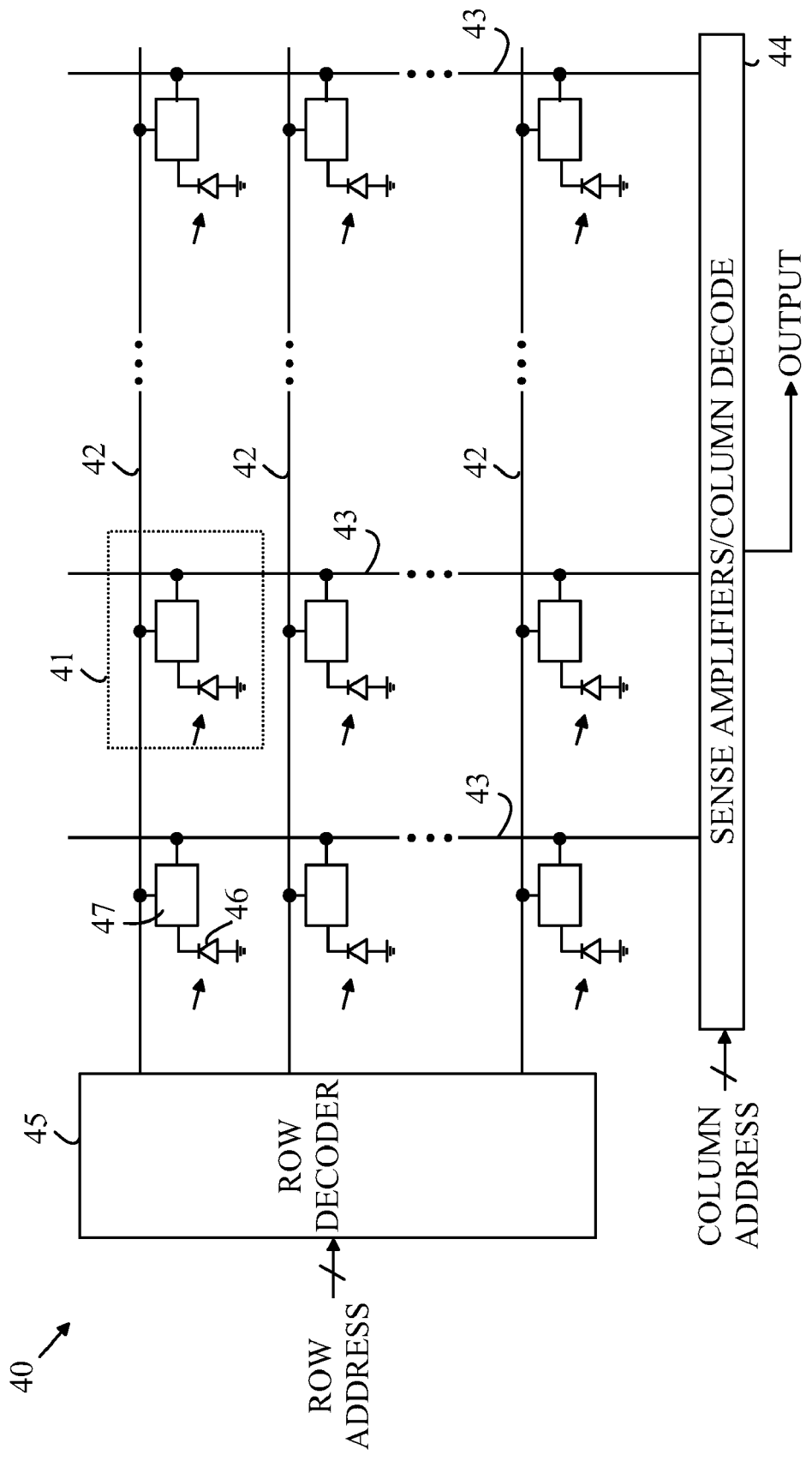
FIG. 1 is a schematic drawing of a prior art CMOS imaging array.

The manner in which the present invention provides its advantages can be more easily understood with reference to FIG. 1, which is a schematic drawing of a prior art CMOS imaging array. Imaging array 40 is constructed from a rectangular array of pixel sensors 41. Each pixel sensor includes a photodiode 46 and an interface circuit 47. The details of the interface circuit depend on the particular pixel design. However, all of the pixel sensors include a gate that is connected to a row line 42 that is used to connect that pixel sensor to a bit line 43. The specific row that is enabled at any time is determined by a row address that is input to a row decoder 45. The row select lines are a parallel array of conductors that run horizontally in the metal layers over the substrate in which the photodiodes and interface circuitry are constructed.

The various bit lines terminate in a column processing circuit 44 that typically includes sense amplifiers and column decoders. The bit lines are a parallel array of conductors that run vertically in the metal layers over the substrate in which the photodiode and interface circuitry are constructed. Each sense amplifier reads the signal produced by the pixel that is currently connected to the bit line processed by that sense amplifier. The sense amplifiers may generate a digital output signal by utilizing an ADC. At any given time, a single pixel sensor is read out from the imaging array. The specific column that is read out is determined by a column address that is utilized by a column decoder to connect the sense amplifier/ADC output from that column to circuitry that is external to the imaging array.

Figure 2:
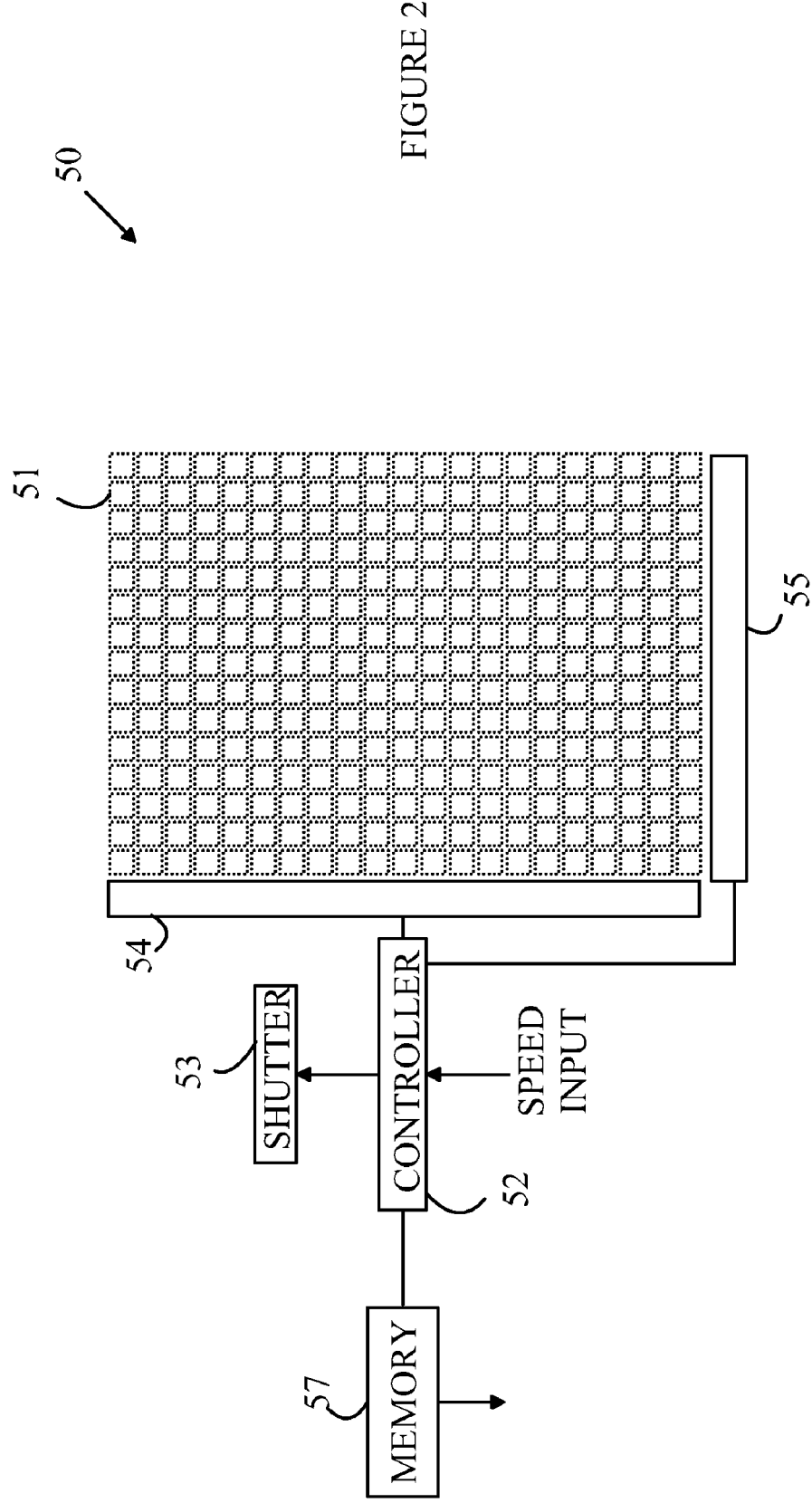
FIG. 2 is a schematic drawing of a camera according to one embodiment of the present invention.

Refer now to FIG. 2, which is a schematic drawing of a camera according to one embodiment of the present invention. Camera 50 includes a CMOS imaging array 51 that is operated by a controller 52. For the purposes of this discussion, the number of rows of photodetectors in imaging array 51 will be denoted by N. Controller 52 also operates the camera shutter 53 and controls the readout of the imaging array and the accumulation of data in memory 57. In this embodiment, the imaging array is read out one row at a time by controlling the row decoder 54 and digitizing the charge stored in each pixel using column decoder 55 and the ADC associated with the individual columns. The data from each frame is accumulated in a memory 57. After each frame is read out, imaging array 51 is reset and a new image formed.

Refer now to FIGS. 3 and 4, which illustrate the motion of an image across imaging array 51 at two times at which shutter 53 is activated to capture image data. In this illustration, the scene is composed of a number of objects such as object 71. The scene moves relative to imaging array 51 in the direction shown by arrow 72.

The image acquisition process operates by coordinating the operation of shutter 53 with the shifting of the image in imaging array 51. Assume that the image is positioned relative to imaging array 51 as shown in FIG. 3 when the shutter is opened to provide an exposure. The exposure time is set to be small compared to the time that is needed for the image to move less than one pixel size across imaging array 51. After the exposure is completed, the data in imaging array 51 is read out and accumulated in the appropriate memory locations in memory 57.

During this time, the image is moving relative to imaging array 51. When the image has moved a distance corresponding to one row of pixels as shown in FIG. 4, the shutter is operated again to provide another short exposure. The imaging array can be viewed as a shifting window that moves over a larger scene. If successive images are shifted by the correct amount and added together, an image with improved statistical accuracy can be obtained.

Denote the signal from $j^{th}$ pixel in the $i^{th}$ row of the image in the $k^{th}$ exposure by $^kI_{i,j}$. Here, i runs from 1 to N and j runs from 1 to M. Here, the first row is the first row in the imaging array that the image of an object encounters as the image moves over the imaging array. The first and $N^{th}$ rows are labeled in FIG. 4. Consider the case in which two successive exposures are taken separated by a time equal to the time needed for the image to move one row over the imaging array. Then $^kI_{i,j}=^{k-1}I_{i-1,j}$, $^kI_{1,j}$ will contain information about the portion of the image that just entered the imaging array, and the portion of the image that was in $^{k-1}I_{N,j}$ will no longer be visible in the imaging array.

In one embodiment of the present invention, memory 57 is used to accumulate data on the portion of the larger image that is currently visible in imaging array 51. In this embodiment, memory 57 includes a rectangular memory array $S_{i,j}$ for i=1 to N and j=1 to M. It will be assumed that successive exposures are timed such that the exposures are separated by the time needed for the window to move a distance of one row of the imaging array over the larger image. At the start of the imaging process, all of the locations in $S_{i,j}$ are set to 0. Denote the image that was just recorded in imaging array 57 by $I_{i,j}$. This image is processed as follows. First, the data stored in $S_{N,j}$ is read out by the controller as the next completed image line. Then, $S_{k,j}$ is set to $S_{k-1,j}+I_{k,j}$ for k=2 to N and j=1 to M. Finally, $S_{1,j}$ is set to $I_{1,j}$ for j=1 to M. In this embodiment the row of S that is read out will contain the data from N exposures after an initial period of N exposures. Hence, this embodiment of the present invention provides a "strip image" of the larger scene having N times the statistics of an individual exposure.

In the above-described embodiments, successive exposures are taken each time the image shifts by a distance corresponding to one row of the imaging array. However, embodiments in which the successive exposures are taken after the image has shifted by other numbers of rows can also be constructed. Denote the number of rows by which the image shifts over the imaging array between exposures by D. To simplify the discussion, it will be assumed that N/D is an integer. The process begins by resetting the contents of $S_{i,j}$ to 0. When data from the current imaging array is available, the previously stored data in $S_{N,j}$ through $S_{N-D+1,j}$ is read out, as those rows will not be further updated. Then, $S_{k,j}$ is set to $S_{k-D,j}+I_{k,j}$ for k=D+1 to N and j=1 to M. Finally, $S_{k,j}$ is set to $I_{k,j}$ for j=1 to M and k=1 to D. In this embodiment, each finished row that is read out includes the data from N/D exposures.

The above embodiment uses an external mechanical shutter as an example. However, other forms of shutters such as an electronic shutter could be utilized.

The minimum time between exposures depends on the speed with which the data from the previous exposure can be processed. If this processing time is less than the time needed for the image to move one row over the imaging array, then D can be set to 1. Hence, imaging array configurations that allow fast read out of the array can be advantageous in some applications. One factor that limits the readout time is the time needed to digitize the signal from each of the pixel sensors. Since the rows are processed one at a time, the readout time for the array is increased by a factor of N times the digital conversion time for each pixel sensor signal. In one embodiment, this digital conversion time is reduced by a factor N by including an ADC in each pixel sensor.

Figure 5:
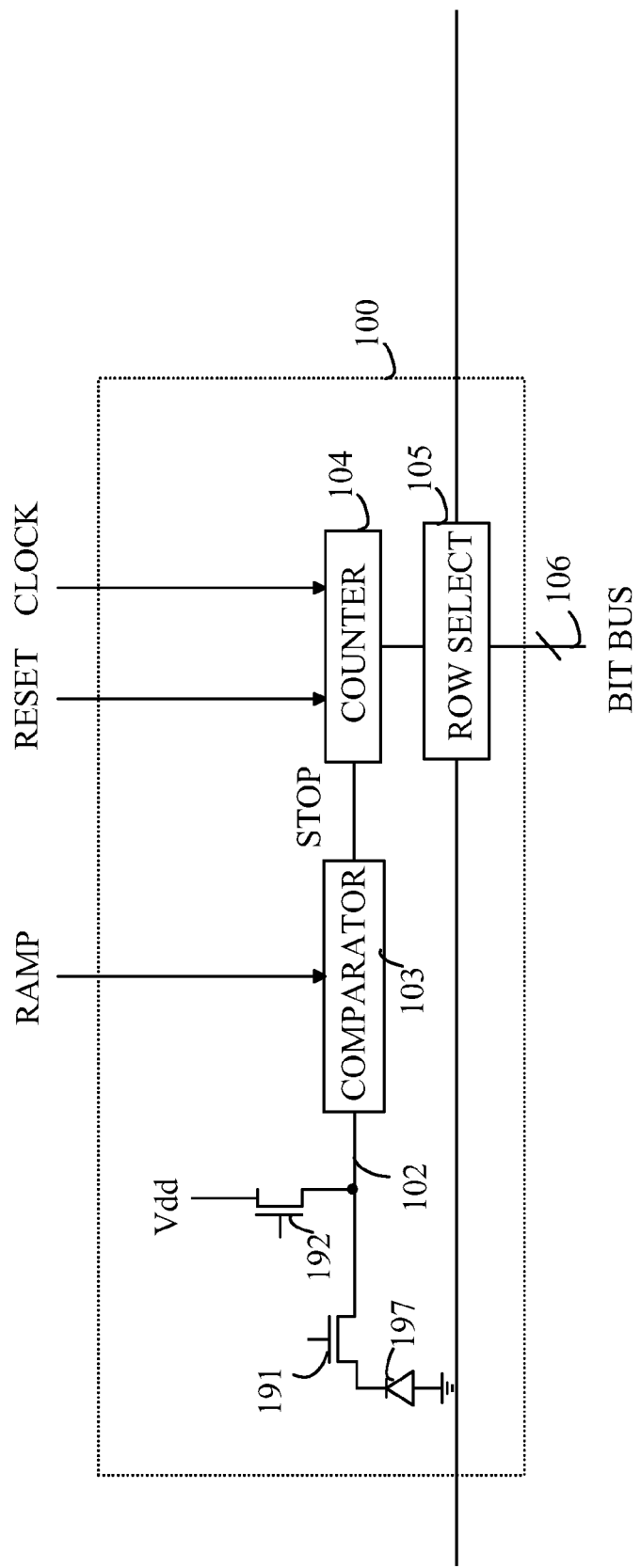
FIG. 5 is a schematic drawing of a pixel sensor that utilizes a distributed analog-to-digital converter (ADC) according to one embodiment of the present invention.

Refer now to FIG. 5, which is a schematic drawing of a pixel sensor that utilizes a distributed ADC according to one embodiment of the present invention. Pixel sensor 100 includes a photodiode 197 that is connected to a transfer gate 191 and a reset transistor 192 that operate in a manner analogous to that described above. After the pixels in the array containing pixel sensor 100 have been exposed, the charge on each of the photodiodes is digitized. At the start of the digitization process, the charge stored on photodiode 197 is coupled to node 102 by applying a signal to gate 191. The counter is then reset and begins to count clock pulses while the potential on the other input of the comparator 103 is increased. The potential on the ramp line is linearly related to the count that has accumulated in counter 104. When the ramp potential is equal to the potential at node 102, the comparator 103 generates a stop signal that is applied to counter 104. Hence, counter 104 is left with a count that is related to the potential at node 102. After all of the pixels have been digitized in this manner, the pixels are read out one row at a time using a row decoder that operates a set of row select switches 105 that connect the counter output to a bit bus 106, which serves a function analogous to the bit lines described above, albeit the signal on the bit line is in digital format instead of the analog format described above. In this embodiment, the bit bus includes one line per bit in counter 104. Hence, the counter is read out in parallel down bit bus 106. While this embodiment utilizes a bit bus that reads out the counter bits in parallel, embodiments in which the bits in the counter are shifted down a single conductor bit line can also be constructed.

It should be noted that all of the data stored as an analog charge in the pixels is digitized at the same time; hence, the analog-to-digital conversion of the data is reduced to the time needed to read out one row in the embodiments discussed above. Once the data has been digitized, the photodiodes can be reset by placing gates 192 and 191 in the conducting state. A new exposure can then be commenced while the data stored in the counters is being read out.

Figure 6:
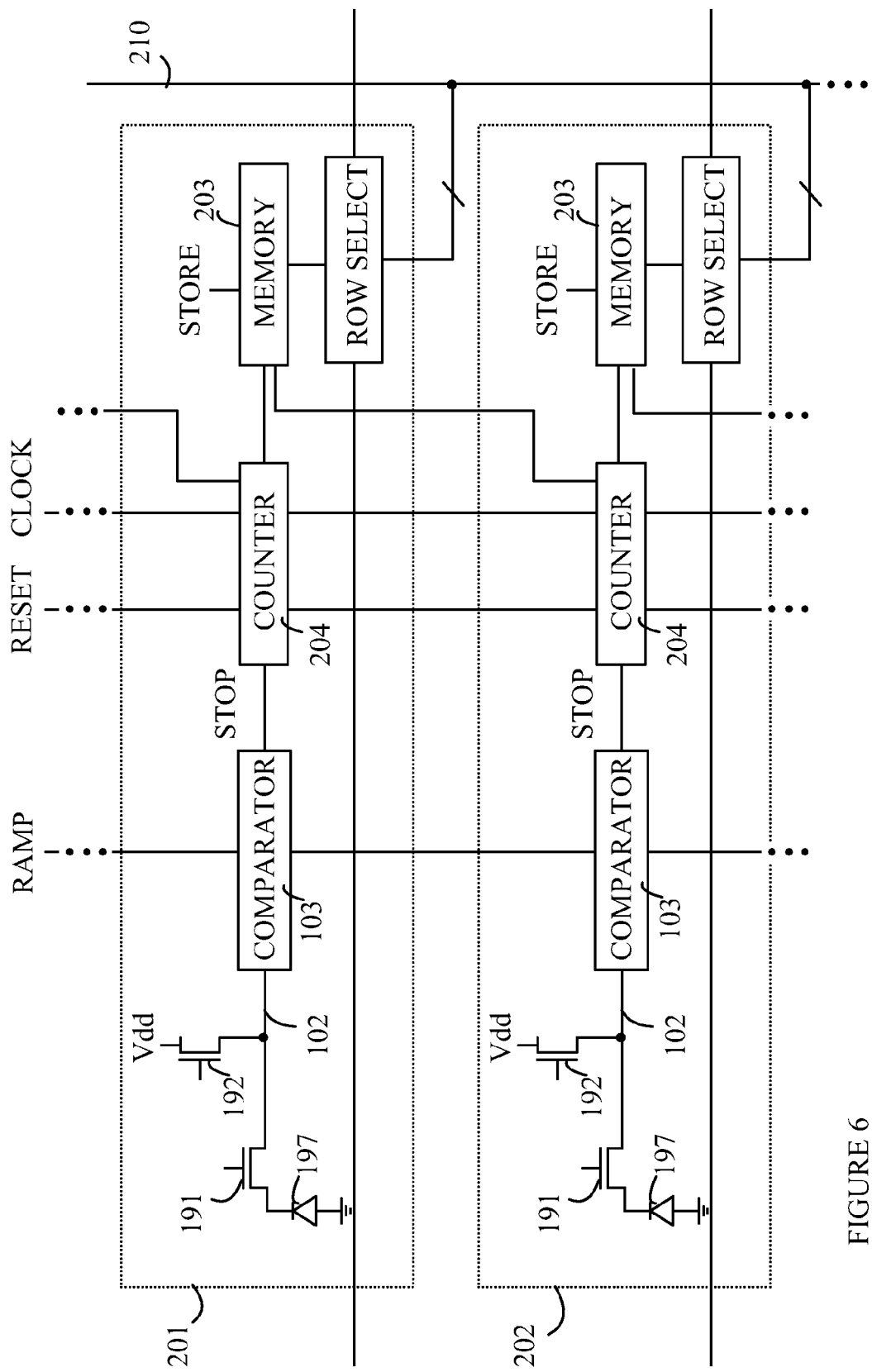
FIG. 6 is a schematic drawing of a portion of one column of an imaging array according to another embodiment of the present invention.

Embodiments in which the memory is incorporated in the imaging array can also be constructed to further reduce the processing time. Refer now to FIG. 6, which is a schematic drawing of a portion of one column of an imaging array according to another embodiment of the present invention. FIG. 6 shows two pixel sensors 201 and 202 that are in the middle of one column of pixel sensors. Each pixel sensor includes a photodiode 197 and associated circuitry that operate in a manner analogous to that discussed above with reference to FIG. 5. Each pixel also includes a counter 204 and a memory register 203. The counters differ from those discussed above in that each counter is reset to the count contained in the memory register 203 of the pixel sensor above the pixel sensor in question in the column. That is, the counter 204 in pixel sensor 202 is reset to the value stored in memory register 203 in pixel sensor 201, and so on. The counter in the first pixel sensor in the column is reset to zero. Hence, when the signal from the photodiode in the pixel sensor is digitized, the counter in that pixel sensor automatically adds the value of the previously stored value in the pixel sensor above that pixel sensor in the column. At the end of the digitization process, the contents of each counter are transferred to the memory register in the pixel sensor containing that counter when a STORE signal is asserted.

The memory registers can also be reset to zero when a reset signal is applied to the memory registers. To simplify the drawings, the memory reset lines have been omitted.

The values in the memory register of any given line can be read out by connecting that memory register to the bit bus 210 corresponding to that counter. While the embodiment shown in FIG. 6 includes one row select circuit per pixel sensor, in principle, only the last row of pixel sensors in the imaging array must include a row select gate, since that row is the only row that is actually read out in this embodiment. The additional row select circuits shown in FIG. 6 are utilized for diagnostic purposes.

Figure 7:
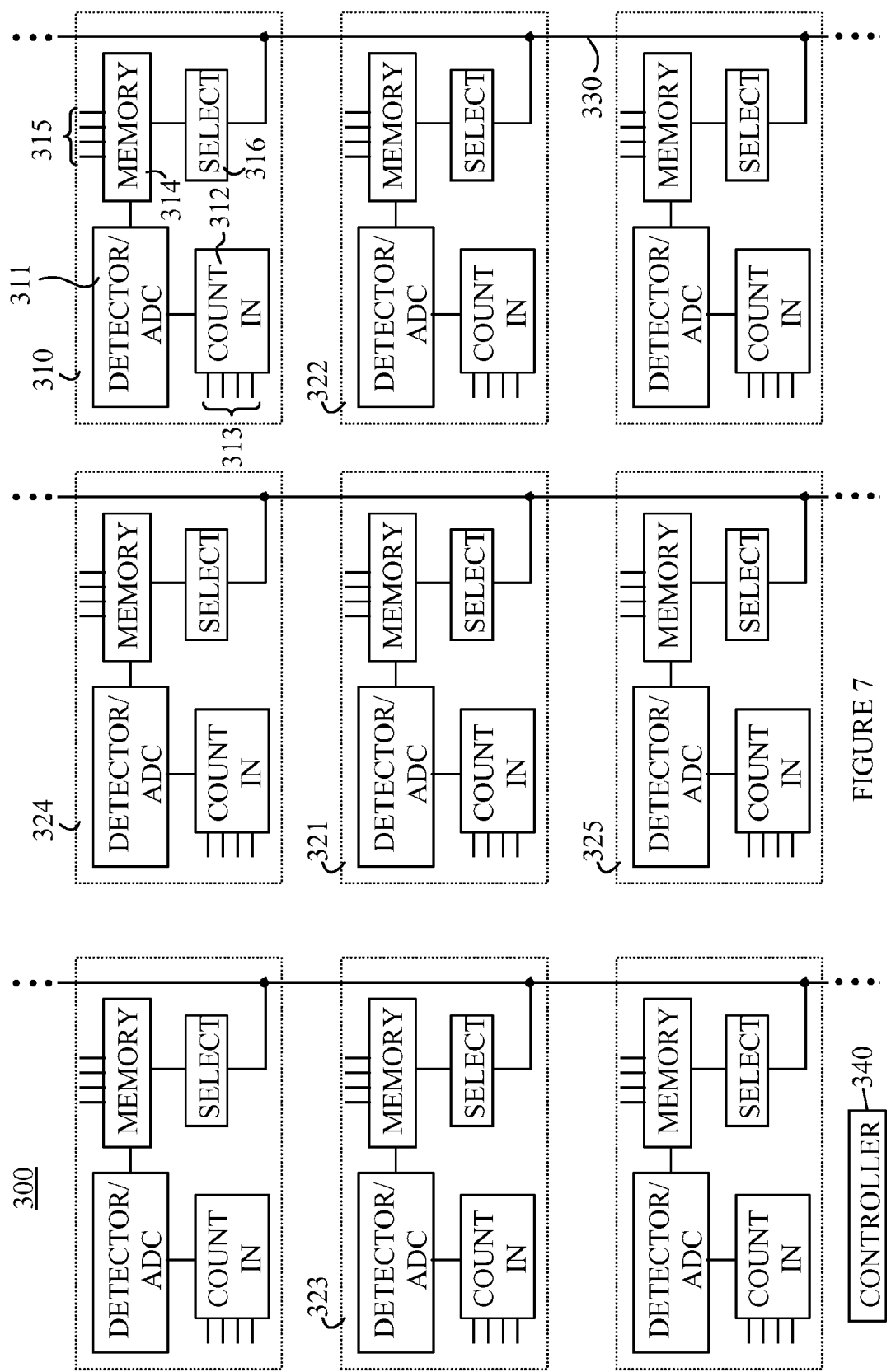
FIG. 7 illustrates a portion of three columns of pixel sensors in another embodiment of an imaging array according to the present invention.

In the embodiment shown in FIG. 6, the memory arrangement allowed the image to effectively be shifted in one direction within the imaging array down each column. However, embodiments that allow the image to be shifted both up and down as well as right and left can also be constructed. Refer now to FIG. 7, which illustrates a portion of three columns of pixel sensors in another embodiment of an imaging array according to the present invention. Imaging array 300 is constructed from a plurality of pixel sensors such as pixel sensor 310. Each column of pixel sensors shares a vertical bus such as bus 330. To simplify the following discussion, each pixel sensor is shown as having four elements. The elements are explicitly labeled in pixel sensor 310. Element 311 includes the photodiode, gating circuitry and counter that provides the ADC functions described above with reference to FIG. 6. The output of the counter in element 311 is stored in memory 314 in response to a command in a manner analogous to that described above with reference to FIG. 6. The output of memory 314 can also be read out on bus 330 using row select circuit 316 in a manner analogous to that discussed above.

To simplify the drawing, the various control lines to the elements have been omitted. In addition, the row select lines and column decode and readout circuitry have been omitted from the drawing. However, it is to be understood that the various elements are under the control of controller 340.

The contents of memory 314 are presented on four output lines shown at 315. As will be explained in more detail below, each output line is connected to a multiplexer 313 in an adjacent pixel sensor. Each pixel sensor includes multiplexer 312 that has four input lines that are connected to the memories in each of four adjacent pixel sensors in the array. The output of multiplexer 312 determines the starting value that is loaded into the counter in element 311 prior to digitizing the signal from the photodiode in a manner analogous to that discussed above with reference to FIG. 6. For example, the memory outputs from the memory element in pixel sensor 321 are connected to the multiplexers in pixel sensors 323, 324, 322, and 325. Similarly, the multiplex inputs for the multiplexer in pixel sensor 321 are connected to the memory outputs in pixel sensors 323, 324, 322, and 325. Hence, the image can be shifted up, down, left, or right by appropriate signals to the multiplexers, which are under the control of controller 340.

Referring back to FIG. 2 the above-described scheme depends on knowledge of the speed with which the image is moving relative to imaging array 51. This information can be provided to controller 52 directly from knowledge of the speed of aircraft over the terrain and the optical properties of the camera lens system that images the terrain onto imaging array 51.

Alternatively, the relative speed of the image over imaging array 51 can be determined by controller 52 by comparing images taken at various time separations. For example, controller 52 could take two separate exposures of the image separated by a known time difference. Each image is completely read out in the conventional manner after that image is taken. Controller 52 then computes the cross-correlation of the two images after one of the images has been shifted relative to the other by a predetermined number of rows. This process is repeated for different values of the relative shift until the shift that produces the maximum cross-correlation between the images is determined.

The time between the images must be sufficient for the image to move a relatively large number of rows relative to the imaging array and for the first image to be completely read out prior to taking the second image. The optimum time can be computed from an estimate of the speed of the aircraft or by trial and error.

The above-described scheme also assumes that the image is moving relative to the imaging array in a direction parallel to the columns of photosensors within the imaging array. If the image moves at a non-zero angle relative to the columns of pixels, data from different columns in the image will be added together, and hence, the resulting composite image will be in error. In some cases, the image will be known to be moving in a precise direction. In this case, the camera need only be aligned with that direction.

In other cases, such as aerial photography, the image may be moving in a skewed direction even when the camera is precisely aligned with respect to the fuselage of the aircraft. For example, when the aircraft is subjected to a cross-wind in flight, the aircraft must be pointed into the cross-wind to assure that the flight path of the aircraft remains aligned with the desired tracking direction on the ground. In this case, the imaging array will not be aligned with the flight path even though the imaging array is aligned with the fuselage of the aircraft.

Figure 8:
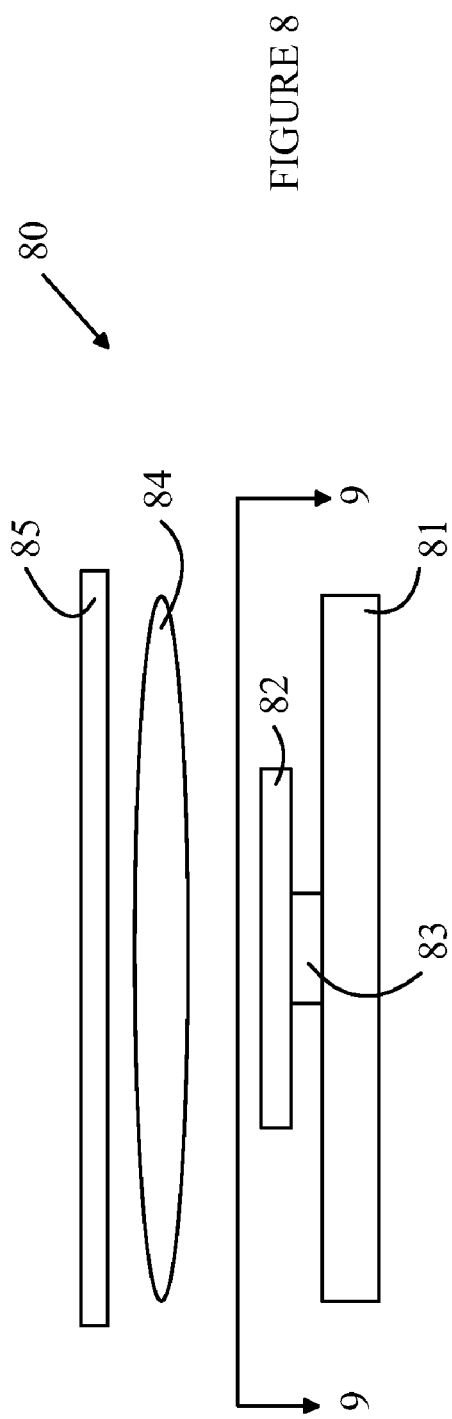
FIG. 8 is a cross-sectional view of camera 80.
Figure 9:
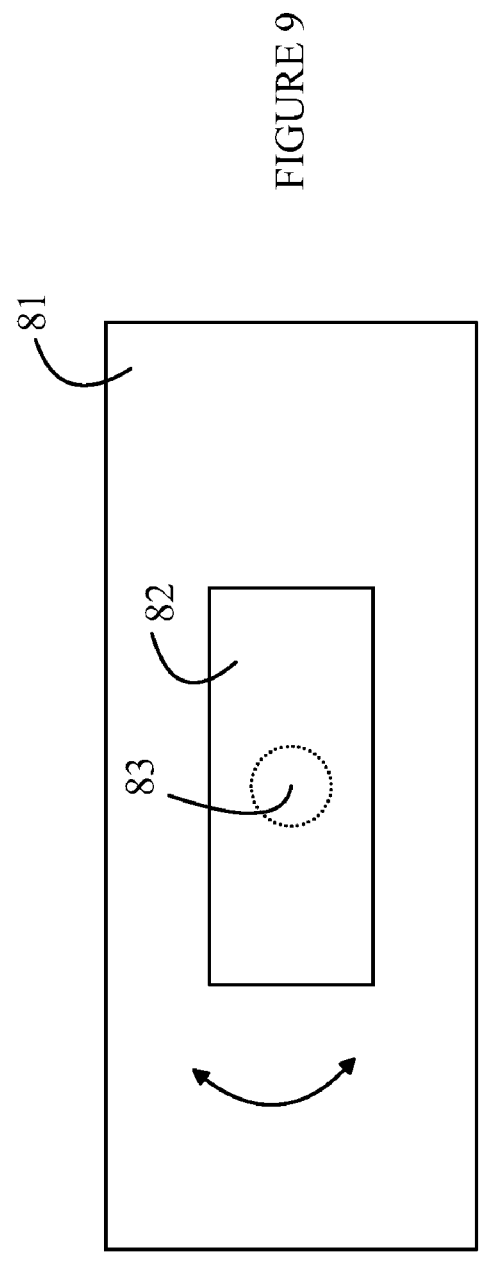
FIG. 9 is a top view showing the imaging array through line 9-9 shown in FIG. 8.

In one embodiment of the present invention, an alignment actuator is included in the camera to compensate for misalignment of the imaging sensor relative to the direction of motion of the image relative to the imaging sensor. Refer now to FIGS. 8 and 9, which illustrate a camera according to another embodiment of the present invention. FIG. 8 is a cross-sectional view of camera 80, and FIG. 9 is a top view showing the imaging array through line 9-9 shown in FIG. 8.

Camera 80 includes an imaging array 82 similar to imaging array 51 discussed above. A lens system 84 projects the image to be recorded onto imaging array 82. Each exposure is controlled by a shutter 85 that is under the control of a controller such as controller 52 discussed above. To simplify the drawings, the controller has been omitted from the drawings. Camera 80 includes a housing 81 that is rigidly attached to a surface of the aircraft. A rotational actuator 83 couples imaging array 82 to housing 81. Rotational actuator 83 is under the control of the controller and is utilized to adjust the alignment of imaging array 82 with respect to the direction of motion of the image relative to imaging array 82.

In practice, the extent of any misalignment can be determined in a manner analogous to that discussed above with reference to measuring the speed with which the image is moving over imaging array 82. Two images are taken separated in time by a time difference that is sufficient to assure that each image includes a portion of the other image and that portion is separated in the two images by a sufficient number of rows to allow the speed with which the image is moving relative to the imaging array and the alignment of the image relative to the rows of the imaging array to be determined. The speed and alignment can be determined in a single search operation. The first image is shifted relative to the second image by a displacement consisting of a number of columns and rows. The cross-correlation of the two images is then computed. The process is repeated for a number of different row and column displacements.

The row displacement that produces the highest value for the cross-correlation is then used to determine the speed with which the image is moving relative to the imaging sensor. The column displacement is likewise used to measure the extent of any misalignment of the direction of motion of the image relative to the direction of the columns. Actuator 83 is then used to rotate the imaging array to eliminate the measured alignment error.

Again, the above embodiment uses an external mechanical shutter as an example. However, other shuttering systems such as an electronic shutter could be utilized.

The above-described embodiments of the present invention have been explained in terms of applications in aerial photography, since the problems addressed by the present invention are particularly severe in such applications. However, it will be apparent from the proceeding discussion that a camera according to the present invention could be used in other situations in which an image moves over the imaging sensor. Specialized cameras for use in dental imaging prior to dental surgery fall into this category. Similarly, cameras designed to take panoramic views of a large scene could also benefit from the present invention if the camera is configured with a motion system that causes the image to move over the image sensor at a constant speed in a constant direction.

Various modifications to the present invention will become apparent to those skilled in the art from the foregoing description and accompanying drawings. Accordingly, the present invention is to be limited solely by the scope of the following claims.

What is claimed is:

1. A camera comprising:
  an imaging array comprising a plurality of CMOS pixel sensors organized as a plurality of columns and rows of pixel sensors, said columns being characterized by a column direction, each pixel sensor generating an exposure signal representative of a quantity of light received by said pixel sensor;
  an imaging system that causes a portion of an image of a scene to be projected on said imaging array such that said image of said scene moves across said imaging array in said column direction; and
  a controller that causes said imaging array to form first and second images of said scene at first and second times, said first and second times being chosen such that said image of said scene moves a predetermined number of rows, greater than or equal to one, of said imaging array between said first and second times, each image comprising a plurality of pixel values, one such pixel value corresponding to each of said pixel sensors,
  wherein said controller combines pixel values from a first row in said first image with pixel values from a second row in said second image, said first and second rows being separated by said predetermined number of rows.

2. The camera of claim 1 wherein said predetermined number of rows is one.

3. The camera of claim 1 further comprising a memory comprising a plurality of storage cells organized as a plurality of rows and columns of storage cells, one such storage cell corresponding to each of said pixel sensors, said controller combining said pixel values by adding said pixel values from said first row to said storage cells corresponding to said second row.

4. The camera of claim 3 wherein said rows of pixel sensors comprise a first row of pixel sensors, a plurality of intermediate rows of pixel sensors and a last row of pixel sensors, said image of said scene moving over said first row of pixel sensors prior to moving over said second row of pixel sensors, and wherein said controller causes said M rows of storage cells to be read out of said memory prior to combining said pixel values by adding said pixel values from said first row to said storage cells corresponding to said second row, where M is said predetermined number.

5. The camera of claim 4 wherein the contents of each row of storage cells are shifted by M rows of storage cells prior to said pixel values being added to said storage cells.

6. The camera of claim 5 wherein said first M rows of storage cells are reset prior to said pixel values being added to said storage cells.

7. The camera of claim 3 wherein each pixel sensor comprises a counter register that stores a count that is incremented by an amount that depends on said exposure signal in response to a signal from said controller.

8. The camera of claim 7 wherein each pixel sensor further comprises a storage register comprising one of said storage cells in addition to said counter register, said storage register storing said count from said counter register in response to a signal from said controller.

9. The camera of claim 8 wherein said counter register in a first pixel sensor is initialized with said count stored in said storage register of a second pixel sensor that is different from said first pixel sensor prior to said counter register being incremented.

10. The camera of claim 9 wherein said second pixel sensor is in an adjacent row or an adjacent column.

11. The camera of claim 1 wherein said image moves across said imaging array with a constant speed and said controller determines said speed in a direction parallel to said columns.

12. The camera of claim 11 wherein said controller determines said speed from a signal input to said controller.

13. The camera of claim 11 wherein said controller determines said speed by comparing two images taken at first and second times, respectively, said times being chosen such that said image moves relative to said imaging array by an amount that is greater than one row and less than the number of rows in said imaging array between said first and second times.

14. The camera of claim 1 further comprising an actuator that adjusts an orientation of said imaging array relative to said image of said scene, said controller operating said actuator such that said image of said scene moves across said imaging array parallel to said columns.

15. The camera of claim 14 wherein said camera comprises a housing and said actuator adjusts a position of said imaging array relative to said housing.

16. A method of forming an image of a scene while said image is moving with respect to a camera, said method comprising:
providing an imaging array comprising a plurality of CMOS pixel sensors organized as a plurality of columns and rows of pixel sensors, said columns being characterized by a column direction, each pixel sensor generating an exposure signal representative of a quantity of light received by said pixel sensor;
causing a portion of said image of said scene to be projected on said imaging array such that said image of said scene moves across said imaging array in said column direction;
causing said imaging array to form first and second images of said scene at first and second times, said first and second times being chosen such that said image of said scene moves a predetermined number of rows, greater than or equal to one, of said imaging array between said first and second times, each image comprising a plurality of pixel values, one such pixel value corresponding to each of said pixel sensors; and
combining pixel values from a first row in said first image with pixel values from a second row in said second image, said first and second rows being separated by said predetermined number of rows.

17. The method of claim 16 wherein said predetermined number of rows is one.

18. The method of claim 16 further comprising providing a memory comprising a plurality of storage cells organized as a plurality of rows and columns of storage cells, one such storage cell corresponding to each of said pixel sensors, said combining of said pixel values comprising adding said pixel values from said first row to said storage cells corresponding to said second row.

19. The method of claim 18 wherein said rows of pixel sensors comprise a first row of pixel sensors, a plurality of intermediate rows of pixel sensors and a last row of pixel sensors, said image of said scene moving over said first row of pixel sensors prior to moving over said second row of pixel sensors, and wherein said M rows of storage cells to be read out of said memory prior to combining said pixel values by adding said pixel values from said first row to said storage cells corresponding to said second row, where M is said predetermined number.

20. The method of claim 19 wherein the contents of each row of storage cells is shifted by M rows of storage cells prior to said pixel values being added to said storage cells.

21. The method of claim 18 wherein said first row of storage cells is reset prior to combining said pixel values by adding said pixel values from said first row to said storage cells corresponding to said second row.

22. The method of claim 18 wherein each pixel sensor comprises a counter register that stores a count that is incremented by an amount that depends on said exposure signal.

23. The method of claim 22 wherein each pixel sensor further comprises a storage register in addition to said counter register, said storage register storing said count from said counter register.

24. The method of claim 23 wherein said counter register in a first pixel sensor is initialized with said count stored in said storage register of a second pixel sensor that is different from said first pixel sensor prior to said counter register being incremented.

25. The method of claim 24 wherein said second pixel sensor is in an adjacent row or an adjacent column.

26. The method of claim 16 wherein said image moves across said imaging array with a constant speed and wherein said method further comprises determining said speed in a direction parallel to said columns.

27. The method of claim 26 wherein said speed is determined by comparing two images taken at first and second times, respectively, said times being chosen such that said image moves relative to said imaging array by an amount that is greater than one row and less than the number of rows in said imaging array between said first and second times.

28. The method of claim 16 further comprising adjusting an orientation of said imaging array relative to said image of said scene such that said image of said scene moves across said imaging array parallel to said columns.

* * * * *

UNITED STATES PATENT AND TRADEMARK OFFICE
CERTIFICATE OF CORRECTION

| | |
|---|---|
| PATENT NO. | : 8,049,802 B2 |
| APPLICATION NO. | : 12/129607 |
| DATED | : November 1, 2011 |
| INVENTOR(S) | : Fowler et al. |

Page 1 of 1

It is certified that error appears in the above-identified patent and that said Letters Patent is hereby corrected as shown below:

On the Title Pg.
Item (75) Inventors: Replace "XinQiao Lin" with --XinQiao Liu--

Signed and Sealed this
Tenth Day of April, 2012

David J. Kappos
*Director of the United States Patent and Trademark Office*